United States Patent [19]

Haley

[11] 4,210,619

[45] Jul. 1, 1980

[54] CEMENT BONDED AGGLOMERATE CONTAINING BORON

[76] Inventor: George D. Haley, 12 Imperial Dr., Greenville, Pa. 16125

[21] Appl. No.: 934,926

[22] Filed: Aug. 18, 1978

[51] Int. Cl.$^2$ .............................................. B28B 1/14
[52] U.S. Cl. ................................ 264/140; 106/97; 106/118; 264/333
[58] Field of Search ............... 106/89, 314, 315, 97, 106/118; 264/333, 140

[56] References Cited

U.S. PATENT DOCUMENTS

| | | | |
|---|---|---|---|
| 2,684,913 | 7/1954 | West | 106/89 |
| 3,366,720 | 1/1968 | Burger | 264/333 |
| 3,861,928 | 1/1975 | Slater | 106/89 |
| 3,954,489 | 5/1976 | Uchikawa | 106/89 |

*Primary Examiner*—Donald J. Arnold
*Attorney, Agent, or Firm*—Thomas H. Murray

[57] ABSTRACT

A cement bonded agglomerate containing boron wherein the setting time of the flowable mixture is essentially unchanged is prepared by dissolving a boron compound or compounds, such as boric acid or borax, in water. Next, adding a sufficient amount of a water soluble calcium compound, such as hydrated lime, to chemically react with substantially all of the dissolved boron, the reaction forming an insoluble calcium borate compound which forms a slurry with the water. This slurry is then mixed with material to be agglomerated and cement and poured into a mold. The mold can either produce individual shaped pieces ready for use or a slab which can be broken into the proper size pieces.

4 Claims, No Drawings

CEMENT BONDED AGGLOMERATE CONTAINING BORON

BACKGROUND OF THE INVENTION

This invention relates to a method for producing a product containing boron for use as an alloying agent in the manufacture of iron and steel.

The use and effect of boron as an additive for iron and steel are well documented in the literature of the industry. Small amounts of boron in steel increase hardenability markedly. Boron is used in malleable iron in small amounts (0.0005 to 0.004%) to nucleate temper carbon during annealing. Boron acts as a deoxider in cast iron. Bismuth, a strong carbide stabilizer, is added to iron to prevent gray, or mottled structure in heavy sections. Boron is added in both cases as a graphifizer to off-set the carbide stabilizing effects of bismuth and chromium during the primary graphifizing stage.

Boron is presently added to cupola charges and arc furnaces as boron containing 50% ferrosilicon with boron in the range of 0.05 to 0.10%. Boron containing silvery iron is also used. Ferroboron or nickleboron are added in the ladle to provide the boron alloying agent.

Because the above-described techniques cause the boron content to vary from heat-to-heat due to the variability of the boron containing alloy agent and, because the materials used are expensive, it is desirable to develop a method for producing a boron containing product for use as an alloying agent which is both inexpensive and simple to produce. Further, it is desirable to produce a product which can be easily handled by the automatic weighing and batching equipment used in the iron and steel industry. This invention accomplishes these objectives by a method heretofore believed unadaptable for use with boron compounds, that of adding boron to cement bonded agglomerates.

The problem associated with the addition of boron containing compounds to cement bonded materials, such as concrete or ferroalloy agglomerates, has been the characteristic retardation of the setting time of the flowable cement mixture. In massive concrete placements, such as large dams, the retardation of setting time is desirable to allow placement and consolidation without cold joints or to prevent excess heat buildup. Likewise, retardation may be desirable in hot weather. However, for the preparation of cement bonded ferroalloy agglomerates, economics dictate rapid setting or curing of the materials to produce the maximum quality of agglomerate in the shortest period of time. This invention overcomes the retardation of setting time by a simple, inexpensive method.

The above and other objects and features of this invention will become apparent from the following specification, detailed description and appended claims.

SUMMARY OF THE INVENTION

In accordance with the present invention, a method for producing cement bonded agglomerates where the setting time of the agglomerated mixture is essentially unchanged comprises the steps of dissolving at least one boron compound in water; adding a sufficient amount of at least one water soluble calcium compound to chemically react with substantially all of the dissolved boron to form a slurry; mixing the slurry with material to be agglomerated and cement; pouring the resulting mixture into a suitable mold; and allowing the mixture to set in the mold.

DESCRIPTION OF THE PREFERRED EMBODIMENT

Boron occurs as borates, such as borax, colemanite and rasorite, also known as kernite; as oxides, such as boric oxide; and as acids, such as boric acid. By dissolving one or more of the above boron compounds in water and mixing one or more calcium containing compound, such as oxides or hydroxides, a chemical reaction occurs forming an isoluble calcium borate compound which with the water forms the slurry described previously. It is important to add sufficient calcium containing compounds to react with substantially all of the boron compounds. Excess calcium has been found not to be detrimental in the mixture. When this slurry, water with the insoluble calcium compound suspended therein, is mixed with cement and ferroalloy materials and poured into a mold or formed into a block or brick, normal setting time is not increased.

A specific slurry mixture that has been found useful for addition to cement and ferroalloy material is shown in Table I.

TABLE I

| Boric Acid | 11% |
| --- | --- |
| Water | 56% |
| Hydrated Lime | 33% |

After mixing the slurry containing the ingredients shown in Table I with appropriate amounts of ferroalloy material and cement, the resulting mixture can either be poured into a mold which produces hardened, shaped forms, such as briquettes of a desired size, upon hardening, or it can be poured into a mold which forms a slab which, upon setting, can be passed through a flake breaker, or similar breaking device, to produce pieces of agglomerate properly sized for use in the making of iron and steel alloys.

Although the invention has been shown in connection with certain specific embodiments, it will be readily apparent to those skilled in the art that various changes in form, method steps, and composition can be made to suit requirements without departing from the spirit and scope of the invention.

I claim:

1. A method for producing cement bonded agglomerates containing boron wherein the setting time of the agglomerated mixture is essentially unchanged which comprises the steps of:
    (a) dissolving at least one water soluble boron compound selected from the group consisting of borax, colemanite, rasorite, boric oxide, or boric acid in water;
    (b) adding a sufficient amount of at least one water soluble calcium compound selected from the group consisting of oxides and hydroxides of calcium to chemically react with substantially all of the dissolved boron compound to form a slurry;
    (c) mixing the slurry with ferroalloy materials to be agglomerated and cement to form a flowable concrete mixture;
    (d) next pouring the resulting mixture into a suitable mold; and
    (e) allowing the mixture to set.

2. The method as recited in claim 1 wherein the slurry comprises by weight:

Boric Acid—11%
Water—56%
Hydrated Lime—33%

3. The method as recited in claim 2 wherein the mold produces a hardened slab after setting, said slab then being passed through a flake breaker to produce sized pieces for use as an alloying material.

4. The method as recited in claim 2 wherein the mold produces hardened, shaped forms of a desired size.

* * * * *